(12) United States Patent
Laurello

(10) Patent No.: US 9,494,081 B2
(45) Date of Patent: Nov. 15, 2016

(54) TURBINE ENGINE SHUTDOWN TEMPERATURE CONTROL SYSTEM WITH AN ELONGATED EJECTOR

(71) Applicant: Vincent P. Laurello, Hobe Sound, FL (US)

(72) Inventor: Vincent P. Laurello, Hobe Sound, FL (US)

(73) Assignee: Siemens Aktiengesellschaft, München (DE)

( * ) Notice: Subject to any disclaimer, the term of this patent is extended or adjusted under 35 U.S.C. 154(b) by 51 days.

(21) Appl. No.: 13/890,297

(22) Filed: May 9, 2013

(65) Prior Publication Data

US 2014/0331637 A1  Nov. 13, 2014

(51) Int. Cl.
*F02C 7/18* (2006.01)
*F02C 7/24* (2006.01)
*F02C 7/16* (2006.01)
*F01D 25/12* (2006.01)
*F01D 25/14* (2006.01)

(52) U.S. Cl.
CPC ............ *F02C 7/24* (2013.01); *F01D 25/12* (2013.01); *F01D 25/14* (2013.01); *F02C 7/16* (2013.01); *F02C 7/18* (2013.01); *F05D 2260/231* (2013.01); *F05D 2260/608* (2013.01)

(58) Field of Classification Search
CPC ............ F02C 7/16; F02C 7/18; F02C 7/185; F01D 25/12
USPC .......... 60/80, 752–760, 39.37, 796; 415/108, 415/182.1, 183, 175, 176
See application file for complete search history.

(56) References Cited

U.S. PATENT DOCUMENTS

| | | |
|---|---|---|
| 2,548,485 A | 4/1947 | Lubbock et al. |
| 3,737,152 A | 6/1973 | Wilson |
| 4,422,300 A | 12/1983 | Dierberger et al. |
| 4,441,324 A | 4/1984 | Abe et al. |
| 4,494,545 A | 1/1985 | Slocum et al. |
| 4,695,247 A | 9/1987 | Enzaki et al. |
| 4,944,152 A | 7/1990 | Shekleton |
| 5,109,671 A | 5/1992 | Haasis |
| 5,205,115 A | 4/1993 | Plemmons et al. |
| 5,209,059 A | 5/1993 | Ward |
| 5,375,420 A | 12/1994 | Falls et al. |
| RE34,962 E | 6/1995 | Shekleton et al. |
| 5,435,139 A | 7/1995 | Pidcock et al. |

(Continued)

FOREIGN PATENT DOCUMENTS

| | | |
|---|---|---|
| EP | 2196634 A2 | 6/2010 |
| EP | 2497908 A2 | 12/2012 |

(Continued)

*Primary Examiner* — Phutthiwat Wongwian
*Assistant Examiner* — Marc Amar

(57) ABSTRACT

A turbine engine shutdown temperature control system configured to foster consistent air temperature within cavities surrounding compressor and turbine blade assemblies to eliminate turbine and compressor blade tip rub during warm restarts of gas turbine engines is disclosed. The turbine engine shutdown temperature control system may include one or more casing temperature control housings extending along an inner surface of a casing at an outer diameter of the casing and at an upper side region of the casing. The upper side region may be positioned above a horizontally extending centerline of the casing. Fluids may be exhausted from one or more exhaust slots in the casing temperature control housing to isolate the upper side region of the casing from buoyancy effects of hot gases within the casing after shutdown of the gas turbine engine.

16 Claims, 3 Drawing Sheets

(56) References Cited

U.S. PATENT DOCUMENTS

| | | |
|---|---|---|
| 5,758,503 A | 6/1998 | DuBell et al. |
| 6,021,570 A | 2/2000 | Lockyer et al. |
| 6,035,929 A | 3/2000 | Friedel et al. |
| 6,079,199 A | 6/2000 | McCaldon et al. |
| 6,122,917 A | 9/2000 | Senior |
| 6,185,925 B1 | 2/2001 | Proctor et al. |
| 6,282,905 B1 | 9/2001 | Sato et al. |
| 6,322,320 B1 | 11/2001 | Pfeiffer et al. |
| 6,478,534 B2 | 11/2002 | Bangert et al. |
| 6,536,201 B2 | 3/2003 | Stuttaford et al. |
| 6,681,578 B1 | 1/2004 | Bunker |
| 6,701,714 B2 | 3/2004 | Burd et al. |
| 6,857,275 B2 | 2/2005 | Pidcock et al. |
| 6,931,855 B2 | 8/2005 | Glessner et al. |
| 7,065,971 B2 | 6/2006 | Bellucci et al. |
| 7,624,577 B2 | 12/2009 | Patel et al. |
| 7,954,325 B2 | 6/2011 | Burd et al. |
| 8,015,829 B2 | 9/2011 | Coughlan, III et al. |
| 8,079,804 B2 | 12/2011 | Shteyman et al. |
| 8,109,098 B2 | 2/2012 | Parker |
| 2003/0000217 A1 | 1/2003 | North et al. |
| 2008/0310949 A1* | 12/2008 | Kondo .................... F01D 21/00 415/47 |
| 2010/0031665 A1 | 2/2010 | Chokshi et al. |
| 2010/0031666 A1 | 2/2010 | Chokshi et al. |
| 2012/0017596 A1 | 1/2012 | Rudrapatna et al. |
| 2012/0247121 A1 | 10/2012 | Kitamura et al. |
| 2014/0030066 A1* | 1/2014 | Schimmels et al. .......... 415/116 |

FOREIGN PATENT DOCUMENTS

| | | |
|---|---|---|
| JP | 2001289062 | 10/2001 |
| JP | 2002155758 | 5/2002 |
| JP | 2009222062 | 10/2009 |
| WO | 03/093664 | 11/2003 |

* cited by examiner

TURBINE ENGINE SHUTDOWN TEMPERATURE CONTROL SYSTEM WITH AN ELONGATED EJECTOR

FIELD OF THE INVENTION

This invention is directed generally to turbine engines, and more particularly to systems enabling warm startups of the gas turbine engines without risk of compressor and turbine blade interference with radially outward sealing surfaces.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. Because of the mass of these large gas turbine engines, the engines take a long time to cool down after shutdown. The casing component cools at different rates from top to bottom due to natural convection. As a result, the casings cooling faster at the bottom versus the top, and the casings take on a deformed shape during shutdown prior to being fully cooled. The hotter upper surface of the casing versus the cooler bottom surface causes the casing to thermally bend or bow upwards. If the engine undergoes a re-start during the time the casing is distorted, the blade tips will have a tendency to interfere at the bottom location due to the upward bow. Thus, if it is desired to startup the gas turbine before is has completely cooled, there exists a significant risk of damage to the turbine blades due to turbine blade tip rub from the interference between the turbine blade tips and the lade rings at the bottom of the engine due to the deformed shape of the outer casing.

SUMMARY OF THE INVENTION

A turbine engine shutdown temperature control system configured to foster consistent air temperature within cavities surrounding compressor and turbine blade assemblies to eliminate turbine and compressor blade tip rub during warm restarts of gas turbine engines is disclosed. The turbine engine shutdown temperature control system prevents the casing from bowing by preventing the bottom of the casing from cooling faster than the top the casing. The turbine engine shutdown temperature control system may include one or more casing temperature control housings extending along an inner surface of a casing at an outer diameter of the casing and at an upper side region of the casing. The upper side region may be positioned above a horizontally extending centerline of the casing. Fluids, such as, but not limited to, air, may be exhausted from one or more exhaust slots in the casing temperature control housing to isolate the upper side region of the casing from buoyancy effects of hot gases within the casing after shutdown of the gas turbine engine.

The turbine engine shutdown temperature control system may include a casing forming an outer structure surrounding one or more turbine components. The casing may be, but is not limited to being, a combustor casing or a turbine casing. The turbine component may be, but is not limited to being, a combustor or a turbine airfoil assembly. A casing temperature control housing may extend along an inner surface of the casing at an outer diameter of the casing and at an upper side region of the casing. The upper side region may be positioned above a horizontally extending centerline of the casing.

The casing temperature control housing may include one or more exhaust slots extending through an outer wall forming the housing. The turbine engine shutdown temperature control system may also one or more temperature sensors to measure the temperature of the top of the casing and the temperature of the bottom of the casing together with control of the operation schedule of the engine. The exhaust slot may be in communication with a temperature control housing chamber contained within the casing temperature control housing. The exhaust slot may also be configured to exhaust fluids from the temperature control housing chamber into the casing to isolate the upper side region of the casing from buoyancy effects of hot gases within the casing after shutdown of the gas turbine engine. In one embodiment, the exhaust slot in the casing temperature control housing may be directed to exhaust fluids into contact with the inner surface of the casing at the outer diameter of the casing and at the upper side region of the casing. In such an embodiment, the fluids exhausted from the exhaust slot may contact the inner surface of the casing in a nonorthogonal and nonparallel orientation. In another embodiment, the one or more exhaust slots in the casing temperature control housing may be directed to exhaust fluids generally along the inner surface of the casing at the outer diameter of the casing and at an upper side region of the casing.

In one embodiment, the casing temperature control housing may include a plurality of slots positioned within the casing temperature control housing. One or more of the plurality of exhaust slots positioned within the casing temperature control housing may be equally spaced from each other. Further, one or more of the exhaust slots positioned within the casing temperature control housing may be randomly spaced from each other. In yet another embodiment, the slot may be formed from a continuous slot in the casing temperature control housing extending across the entire casing temperature control housing.

The casing temperature control housing may be generally elongated with a length extending partially circumferentially along the inner surface of the casing. The casing temperature control housing may have a radius of curvature equivalent to the inner surface of the casing at the outer diameter of the casing. In another embodiment, the casing temperature control housing may extend about the casing at least 1/32 of a circumference of the casing. In yet another embodiment, a circumferential length of the casing temperature control housing may be greater than a height and a thickness of the same casing temperature control housing.

The casing temperature control housing may include a side surface housing one or more exhaust slots. In one embodiment, at least a portion of the side surface of the casing temperature control housing may be generally linear. The turbine engine shutdown temperature control system may also include one or more turbine engine shutdown temperature control system supply channels in communication with the temperature control housing chamber contained within the casing temperature control housing to supply fluid to the temperature control housing chamber.

In at least one embodiment, the turbine engine shutdown temperature control system may include a plurality of a casing temperature control housings extending along the inner surface of the casing at the outer diameter of the casing and at the upper side region of the casing. One or more of the plurality of casing temperature control housings may be spaced from each other and thus are not in contact with each other. Further, one or more adjacent plurality casing temperature control housings may contact each other.

The turbine engine shutdown temperature control system may be used to foster consistent air temperature within cavities surrounding compressor and turbine blade assemblies to eliminate turbine and compressor blade tip rub during warm restarts of gas turbine engines. The turbine engine shutdown temperature control system may isolate the upper side region of the casing from buoyancy effects of hot gases within the casing after shutdown of the gas turbine engine. The air ejected from the turbine engine shutdown temperature control system entrains gases within the casing. As such, a reduced amount of air emitted from the system is required to operate the system adequately. The turbine engine shutdown temperature control system operates during turning gear operation and thus, there is no impact to normal gas turbine engine operation.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
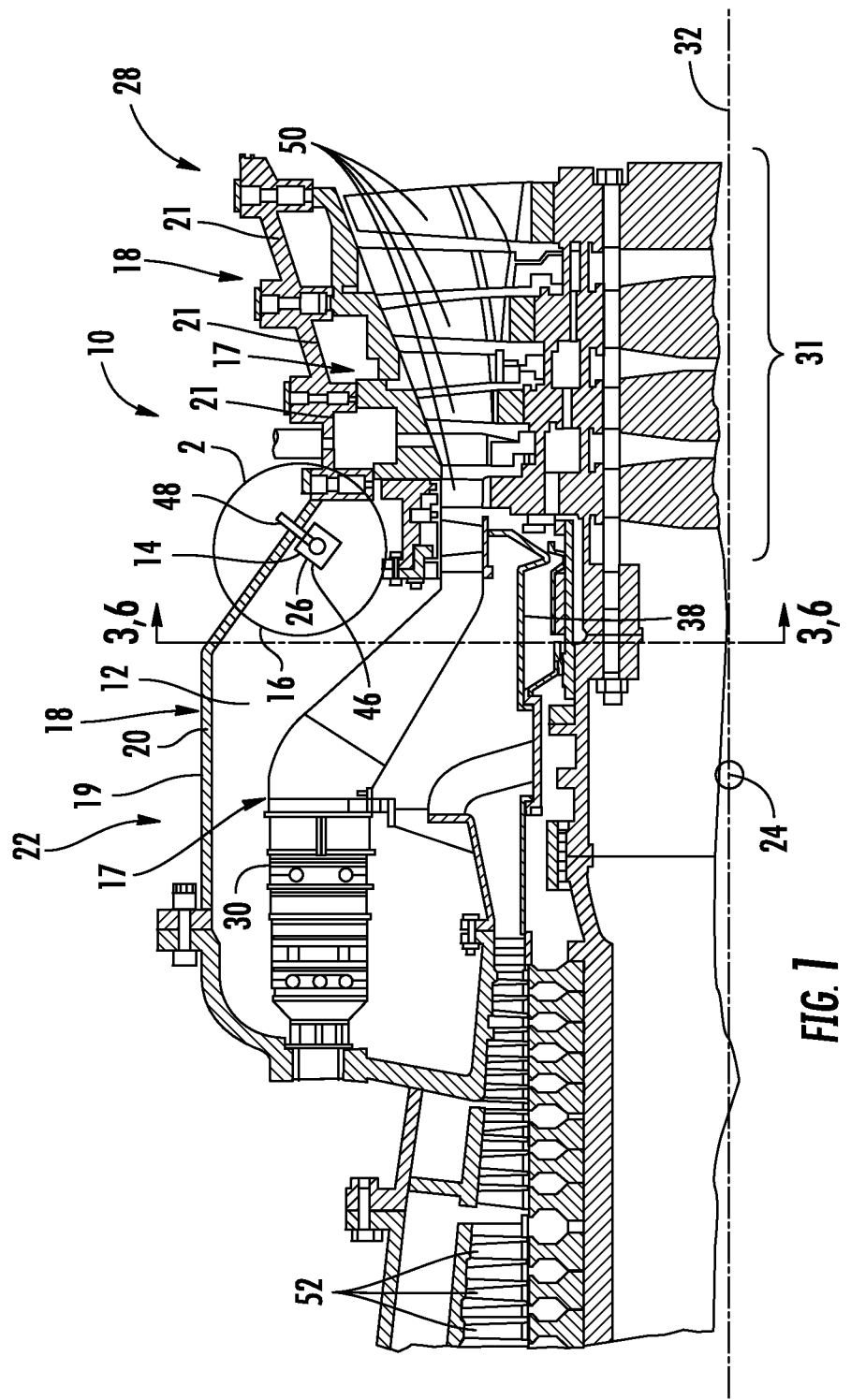
FIG. 1 is a cross-sectional side view of a gas turbine engine with the turbine engine shutdown temperature control system.

As shown in FIGS. 1-6, a turbine engine shutdown temperature control system 10 configured to foster consistent air temperature within cavities 12 surrounding compressor and turbine blade assemblies to eliminate turbine and compressor blade tip rub of the turbine and compressor blades 50, 52 during warm restarts of gas turbine engines is disclosed. The turbine engine shutdown temperature control system 10 prevents a casing 18 from bowing by preventing the bottom of the casing 18 from cooling faster than the top the casing 18. The turbine engine shutdown temperature control system 10 may include one or more casing temperature control housings 14 extending along an inner surface 16 of a casing 18, which may be, but is not limited to being, a combustor casing 19 or a turbine casing 21, at an outer diameter 20 of the casing 18 and at an upper side region 22 of the casing 18. The upper side region 22 may be positioned above a horizontally extending centerline 24 of the casing 18. Fluids may be exhausted from one or more exhaust slots 26 in the casing temperature control housing 14 to isolate the upper side region 22 of the casing 18 from buoyancy effects of hot gases within the casing 18 after shutdown of the gas turbine engine 28.

The turbine engine shutdown temperature control system 10 for a gas turbine engine 28 may include a casing 18 forming an outer structure surrounding one or more turbine components 17, which may be, but are not limited to being, combustor 30 or turbine airfoil assembly 31. In at least one embodiment, as shown in FIG. 1, the casing 18 may surround a plurality of can-annular combustors 30 positioned circumferentially with the combustor casing and about a longitudinal axis 32 of the gas turbine engine 28. The casing 18 may be cylindrical or have another appropriate configuration. The casing 18 may be formed from any appropriate material or combination of materials.

Figure 2:
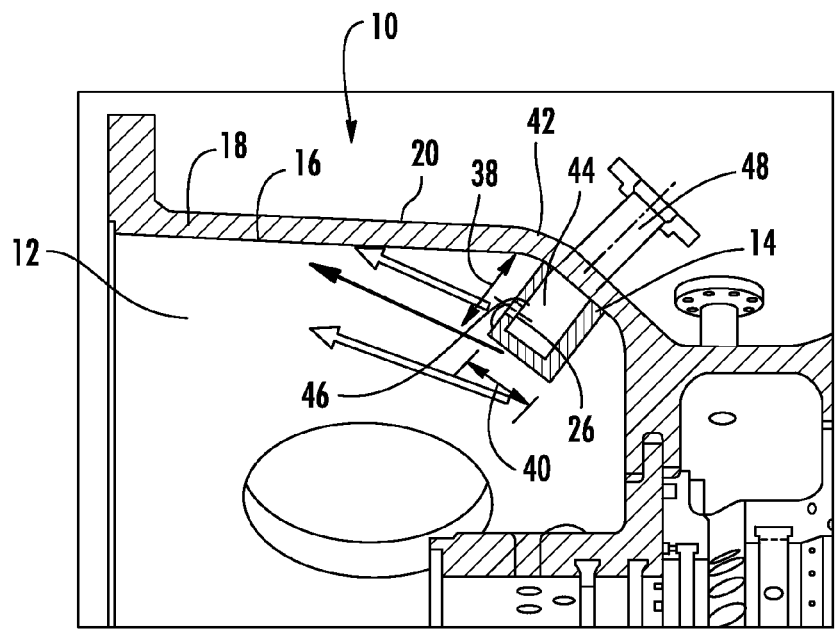
FIG. 2 is a detailed cross-sectional side view of the turbine engine shutdown temperature control system taken at detail 2 in FIG. 1.
Figure 3:
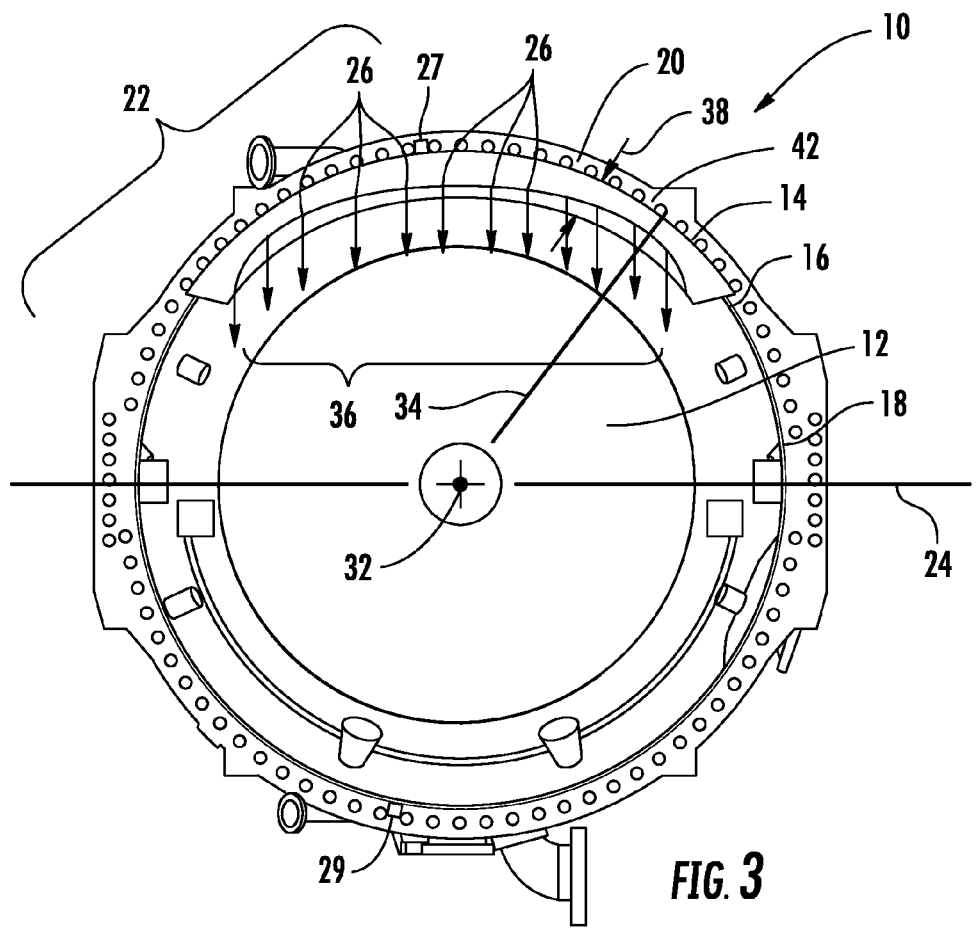
FIG. 3 is an axial view of a combustor casing including the turbine engine shutdown temperature control system taken at section line 3-3 in FIG. 1.

As shown in FIGS. 1-3, the turbine engine shutdown temperature control system 10 may also include a casing temperature control housing 14 that may extend along an inner surface 16 of the casing 18. The casing temperature control housing 14 may be positioned at an outer diameter 20 of the casing 18 and at an upper side region 22 of the casing 18. The upper side region 22 may be positioned above a horizontally extending centerline 24 of the casing 18. The casing temperature control housing 14 may have a radius of curvature 34 equivalent to the inner surface 16 of the casing 18 at the outer diameter 20 of the casing 18. The casing temperature control housing 14 may be generally elongated with a length extending partially circumferentially along the inner surface 16 of the casing 18. The casing temperature control housing 14 may extend about the casing 18 at least 1/32 of a circumference of the casing 18. In at least one embodiment, the circumferential length 36 of the casing temperature control housing 14 may be greater than a height 38 and thickness 40 of the casing temperature control housing 14. In at least one embodiment, the casing temperature control housing 14 may be positioned orthogonal to the longitudinal axis 32 of the casing 18. In another embodiment, the casing temperature control housing 14 may be positioned nonparallel and nonorthogonal to the longitudinal axis 32 of the casing 18.

Figure 4:
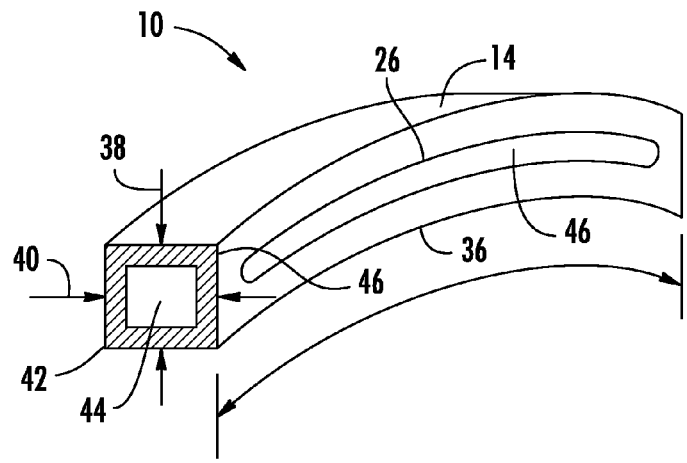
FIG. 4 is a partial cross-sectional view of the casing temperature control housing of the turbine engine shutdown temperature control system.

The casing temperature control housing 14 may include one or more exhaust slots 26 extending through an outer wall 42 forming the housing 14. As shown in FIGS. 2 and 4, the exhaust slot 26 may be in communication with a temperature control housing chamber 44 contained within the casing temperature control housing 14. The exhaust slot 26 may be configured to exhaust fluids from the temperature control housing chamber 44 into the casing 18 to isolate the upper side region 22 of the casing 18 from buoyancy effects of hot gases within the casing 18 after shutdown of the gas turbine engine 28. The exhaust slots 26 may have any appropriate size and configuration, include cross-sectional shape. In at least one embodiment, the exhaust slot 26 may be cylindrical.

Figure 5:
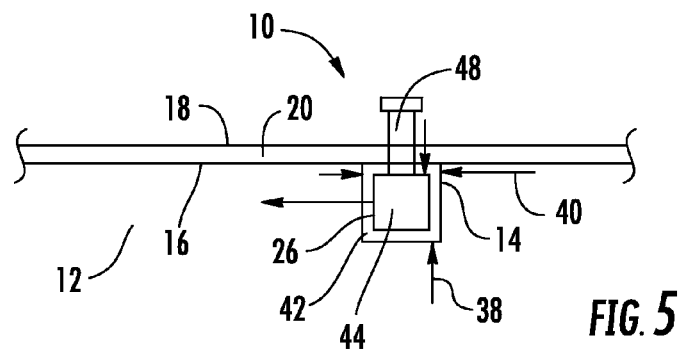
FIG. 5 is a detailed cross-sectional side view of another embodiment of the turbine engine shutdown temperature control system taken at detail 5 in FIG. 1.

In at least one embodiment, as shown in FIG. 2, the exhaust slot 26 in the casing temperature control housing 14 is directed to exhaust fluids into contact with the inner surface 16 of the casing 18 at the outer diameter 20 of the casing 18 and at the upper side region 22 of the casing 18. In such an embodiment, the fluid exhausted from the exhaust slot 26 contacts the inner surface 16 of the casing 18 in a nonorthogonal and nonparallel orientation. In another embodiment, as shown in FIG. 5, the exhaust slots 26 in the casing temperature control housing 14 may be directed to exhaust fluids generally along the inner surface 16 of the casing 18 at the outer diameter 20 of the casing 18 and at an upper side region 22 of the casing 18.

In at least one embodiment, as shown in FIGS. 3 and 4, the casing temperature control housing 14 may include a plurality of slots 26 positioned within the casing temperature control housing 14. One or more of the plurality of slots 26 positioned within the casing temperature control housing 14 may be equally spaced from each other. In another embodiment, one or more of the slots 26 may be randomly spaced from each other. In yet another embodiment, the slot 26 may be formed from a continuous slot in the casing temperature control housing 14 extending across the entire casing temperature control housing 14.

The casing temperature control housing 14 may include a side surface 46 housing one or more exhaust slots 26. In at least one embodiment, at least a portion of the side surface 46 of the casing temperature control housing 14 may be generally linear. In one embodiment, the entire side surface 46 may be linear.

The temperature control housing chamber 44 contained within the casing temperature control housing 14 may be supplied with fluids, such as air. One or more turbine engine shutdown temperature control system supply channels 48 may be in communication with the temperature control housing chamber 44 contained within the casing temperature control housing 14 to supply fluid to the temperature control housing chamber 44.

Figure 6:
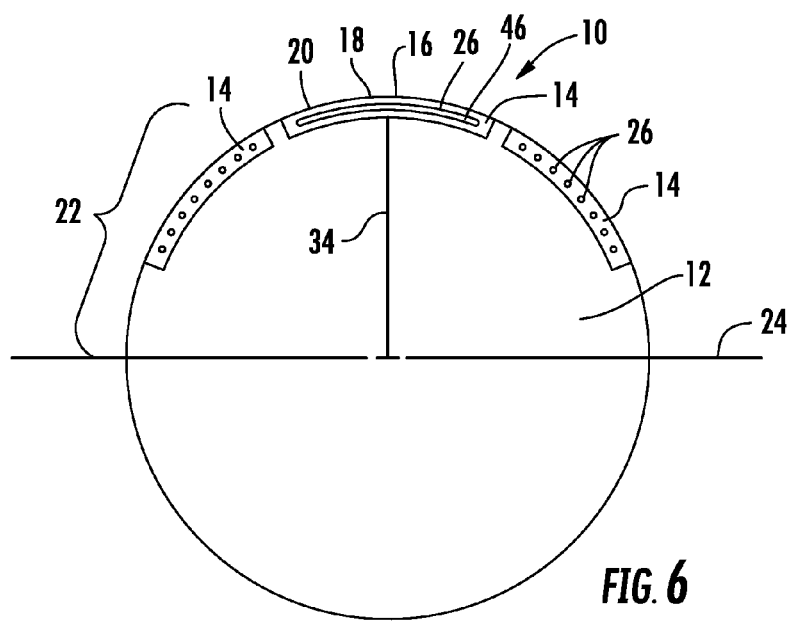
FIG. 6 is an axial view of a combustor casing including another embodiment of the turbine engine shutdown temperature control system taken at section line 6-6 in FIG. 1.

In one embodiment, as shown in FIG. 6, the turbine engine shutdown temperature control system 10 may include a plurality of a casing temperature control housings 14 extending along the inner surface 16 of the casing 18 at the outer diameter 20 of the casing 18. The plurality of a casing temperature control housings 14 may be spaced from each other and thus are not in contact with each other. In another embodiment, adjacent plurality casing temperature control housings 14 may contact each other.

The turbine engine shutdown temperature control system 10 may be used to foster consistent air temperature within cavities 12 surrounding compressor and turbine blade assemblies to eliminate turbine and compressor blade tip rub during warm restarts of gas turbine engines 28. The turbine engine shutdown temperature control system 10 may isolate the upper side region 22 of the casing 18 from buoyancy effects of hot gases within the casing 18 after shutdown of the gas turbine engine 28. The air ejected from the turbine engine shutdown temperature control system entrains gases within the combustor casing. As such, a reduced amount of air emitted from the system is required to operate the system adequately. The turbine engine shutdown temperature control system 10 may also one or more temperature sensors 27, 29 to measure the temperature of the top of the casing and the temperature of the bottom of the casing together with control of the operation schedule of the engine. The turbine engine shutdown temperature control system 10 operates during turning gear operation and thus, there is no impact to normal gas turbine engine operation.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A turbine engine shutdown temperature control system for a gas turbine engine, comprising:
a casing forming an outer structure surrounding at least one turbine component, the casing a first half coupled to a second half, the first and second halves of the casing being positioned on opposite sides of a centerline of the casing;
one or more casing temperature control housings extending along an inner surface of the casing and at an upper side region of the casing, wherein the upper side region is positioned in the first half of the casing, thereby positioning each one of said one or more casing temperature control housings completely in the first half of the casing;
wherein each of the one or more casing temperature control housings includes at least one exhaust slot extending through an outer wall forming the housing, wherein the at least one exhaust slot is in communication with a temperature control housing chamber contained within the casing temperature control housing; and wherein the at least one exhaust slot is configured to exhaust fluids from the temperature control housing chamber into the casing to isolate the upper side region of the casing from buoyancy effects of hot gases within the casing after shutdown of the gas turbine engine; and
wherein each of the one or more casing temperature control housings is generally arc-shaped, being elongated along an arc-length extending partially circumferentially along the inner surface of the casing.

2. The turbine engine shutdown temperature control system of claim 1, wherein the at least one exhaust slot in said each of the one or more casing temperature control housings is directed to exhaust fluids generally along the inner surface of the casing and at an upper side region of the casing.

3. The turbine engine shutdown temperature control system of claim 1, wherein the at least one exhaust slot in said each of the one or more casing temperature control housings is directed to exhaust fluids into contact with the inner surface of the casing and at the upper side region of the casing, wherein the fluids contact the inner surface of the casing in a nonorthogonal and nonparallel orientation.

4. The turbine engine shutdown temperature control system of claim 1, wherein said each of the one or more casing temperature control housings has a radius of curvature equivalent to the inner surface of the casing.

5. The turbine engine shutdown temperature control system of claim 1, wherein said each of the one or more casing temperature control housings extends along the inner surface of the casing at least $\frac{1}{32}$ of a circumference of the casing.

6. The turbine engine shutdown temperature control system of claim 1, wherein the at least one exhaust slot in said each of the one or more casing temperature control housings is comprised of a plurality of exhaust slots positioned within the casing temperature control housing.

7. The turbine engine shutdown temperature control system of claim 6, wherein the plurality of exhaust slots positioned within said each of the one or more casing temperature control housings are equally spaced from each other.

8. The turbine engine shutdown temperature control system of claim 6, wherein the plurality of slots positioned within said each of the one or more casing temperature control housings are randomly spaced from each other.

9. The turbine engine shutdown temperature control system of claim 1, wherein said each of the one or more casing temperature control housings includes a side surface housing the at least one exhaust slot.

10. The turbine engine shutdown temperature control system of claim 9, wherein the side surface of said each of the one or more casing temperature control housings is generally linear.

11. The turbine engine shutdown temperature control system of claim 1, further comprising at least one turbine engine shutdown temperature control system supply channel in communication with the temperature control housing chamber contained within said each of the one or more casing temperature control housings to supply fluid to the temperature control housing chamber.

12. The turbine engine shutdown temperature control system of claim 1, comprising a plurality of a casing temperature control housings extending along the inner surface of the casing, each of the plurality of casing temperature control housings positioned at the upper side region of the casing completely above the centerline.

13. The turbine engine shutdown temperature control system of claim 12, wherein the plurality of casing temperature control housings are spaced from each other and thus are not in contact with each other.

14. The turbine engine shutdown temperature control system of claim 12, wherein adjacent plurality casing temperature control housings contact each other.

15. The turbine engine shutdown temperature control system of claim 1, wherein a circumferential length of said each of the one or more casing temperature control housings is greater than a height and thickness of the casing temperature control housing.

16. The turbine engine shutdown temperature control system of claim 1, wherein the at least one exhaust slot comprises:
- a plurality of exhaust slots spaced from each other along the arc-length of the respective casing temperature control housing, or
- a continuous slot extending along the arc-length of the respective casing temperature control housing.

* * * * *